Oct. 8, 1929.  W. M. FULTON  1,731,130

FLEXIBLE CORRUGATED TUBULAR WALL AND METHOD FOR MAKING THE SAME

Filed Oct. 17, 1921   3 Sheets-Sheet 1

Inventor
Weston M. Fulton,

By Mauro, Cameron, Lewis & Massa
Attorneys

Oct. 8, 1929.  W. M. FULTON  1,731,130
FLEXIBLE CORRUGATED TUBULAR WALL AND METHOD FOR MAKING THE SAME
Filed Oct. 17, 1921   3 Sheets-Sheet 2
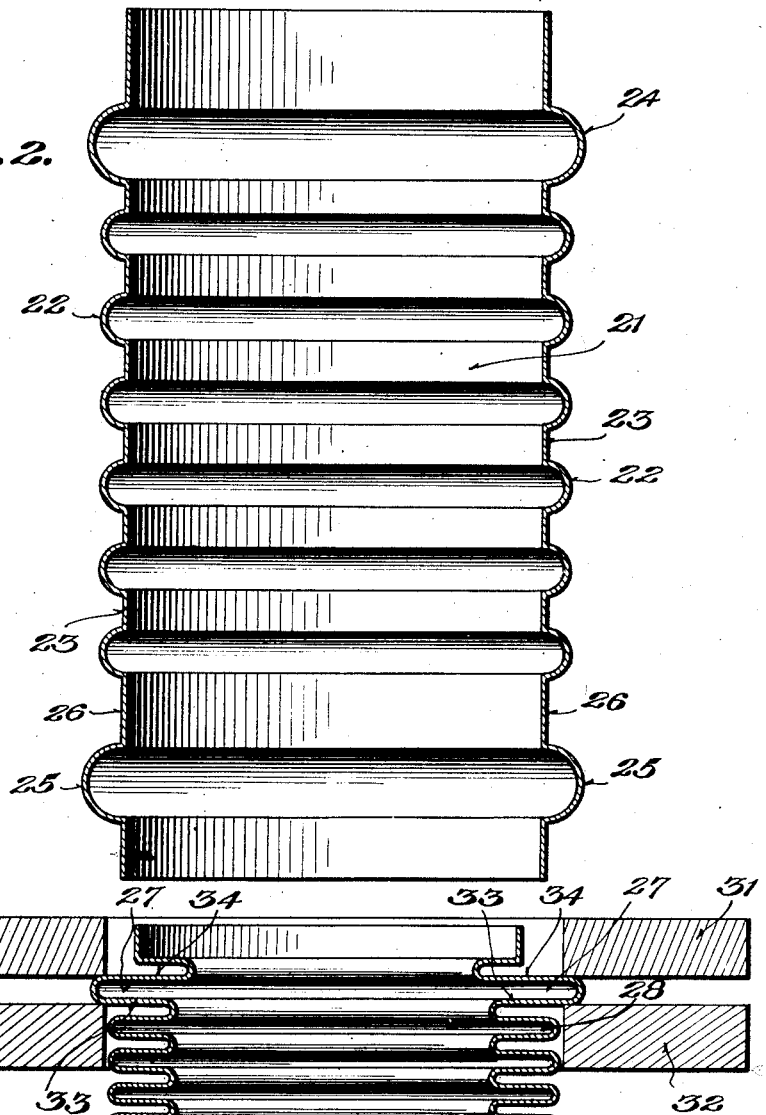
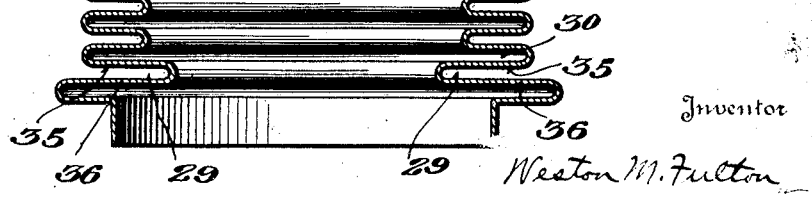
Inventor
Weston M. Fulton
Attorneys Patented Oct. 8, 1929

1,731,130

UNITED STATES PATENT OFFICE

WESTON M. FULTON, OF KNOXVILLE, TENNESSEE, ASSIGNOR, BY MESNE ASSIGNMENTS, TO THE FULTON SYLPHON COMPANY, OF KNOXVILLE, TENNESSEE, A CORPORATION OF DELAWARE

FLEXIBLE CORRUGATED TUBULAR WALL AND METHOD FOR MAKING THE SAME

Application filed October 17, 1921. Serial No. 508,177.

This invention relates to flexible corrugated tubular walls and, more particularly, to an improved manner of construction whereby walls of this character may be readily provided at one or both of their ends with a reinforced flange.

Flexible corrugated tubular walls are ordinarily provided at one or both of their ends with a flange whereby said wall may be mounted in operative relation to its associated parts by clamping said flanges between cooperating elements on said associated parts. To facilitate assembly of said walls with said associated parts, said flanges are ordinarily made of such width that they project a substantial distance beyond the contiguous corrugations of the wall so as to enable the clamping elements to cooperate with portions of said flanges which project beyond the lateral surface of the wall as a whole. Consequently, the flexure of said wall tends to subject the end flanges, owing to their greater width, to relatively great bending stresses and, as walls of this character are commonly made of very thin metal, reinforcement of said flanges becomes necessary to avoid an early failure of said flanges when the wall is in operation.

In my prior Patent No. 1,167,895, granted Jan. 11, 1916, and entitled Collapsible and expansible vessel, I have pointed out the desirability of providing reinforced end flanges on flexible corrugated tubular walls, and disclosed a construction whereby said end flanges may be reinforced and the danger of the early failure thereof overcome, but, while the manner of construction disclosed in said prior patent constitutes a marked improvement over the prior practice in the art, I have found that it possesses a number of disadvantages, of which may be noted the following:—

In order to form the flanges of sufficient width so that they will project beyond the contiguous corrugations and afford an area for contact with clamping elements, said flanges are ordinarily formed by a spinning process, and such process requires special machinery and tools over and above that required for the manufacture of the body portion of the wall. Moreover, the formation of the flanges by the spinning process leaves the peripheries of said flanges more or less irregular and with the flanges on different walls of different diameter, so that in order to get a regular periphery of standard diameter it becomes necessary to subject said flanges to a trimming operation after they have been spun—which entails further machinery, tools, labor and expense. Again, there is a decided tendency for the metal to crack during the spinning process, particularly when forming outwardly extending flanges, apparently because of the fact that the metal is being forced out on circles of greater and greater circumference so that it becomes more and more stressed in circumferential directions. This entails a material loss of product owing to the relatively large number of walls that are spoiled during this step in their process of manufacture. Furthermore, the manufacture of separate reinforcing members requires special machinery and dies and therefore entails additional labor and expense, as well as the handling of an additional part. Moreover, in the process of assembling these separate reinforcing members with the end flanges of the wall, constant care must be exercised to prevent the presence of dirt between the contacting surfaces of the flange and reinforcing member, because such dirt tends to produce irregularities in the completed flange, which irregularities are a constant source of difficulty in securing a fluid-tight joint between the flange and the parts by which it is clamped.

It is an object of this invention to provide a flexible corrugated tubular wall having reinforced flanges at one or both ends thereof, together with a method of making the same, whereby the special machinery and tools, as well as the additional labor and expense, incident to the formation of flanges by a spinning process and the manufacture of separate reinforcing members is avoided, the loss incident to the cracking of the metal during the spinning process is eliminated, and the necessity of manufacturing and handling separate parts, as well as the exercise of extreme care in assembling the same, is overcome.

Other objects of the present invention are to provide a wall of the type characterized, together with a method of making the same, whereby said wall may be simply and inexpensively provided with reinforcing flanges that may be made as strong and durable as desired, whereby the use of soldering, brazing or welding in forming such flanges is unnecessary, and whereby the formation of fluid tight joints with the clamping elements of the associated parts is facilitated.

Stated broadly, the invention comprises a flexible corrugated tubular wall provided at one or both of its ends with a reinforced flange formed of an integrally continuous section of said wall folded back upon itself and preferably taking the form of substantially parallel sections pressed into engagement. In the preferred embodiment of said invention, the flexible corrugated tubular wall is provided at one or both of its ends with one or more corrugations which are deeper than the contiguous corrugations of the body portion of the wall, and said deep corrugations are compressed, preferably until their lateral walls are in engagement, into reinforcing relation with each other. The peripheral portion of the outer section of said flange may also be readily formed if desired so as to reinforce the bend of the contiguous corrugation in the body portion of the wall.

The invention is capable of receiving a variety of mechanical expressions and the method of manufacture of being carried out in a variety of ways, some of which are illustrated on the accompanying drawings, but it is to be expressly understood that the drawings are for the purpose of illustration only and are not to be construed as a definition of the limits of the invention, reference being had to the appended claim for that purpose.

In said drawings, wherein the same reference characters are employed to designate corresponding parts in the several figures:—

Fig. 2 is a diagrammatic axial section of a wall in course of manufacture illustrating one manner by which reinforced flanges embodying the present invention may be formed;

Fig. 3 is a diagrammatic axial section illustrating a manner by which deep corrugations may be compressed to form reinforced flanges;

Figure 7:
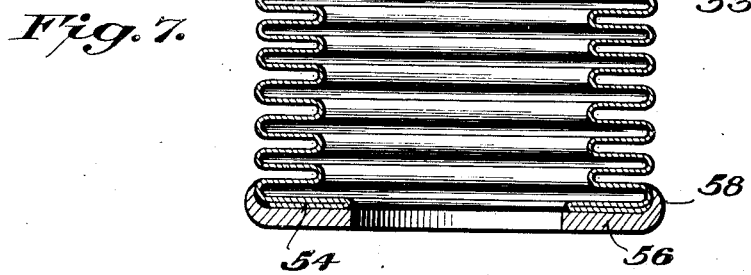
Figure 8:
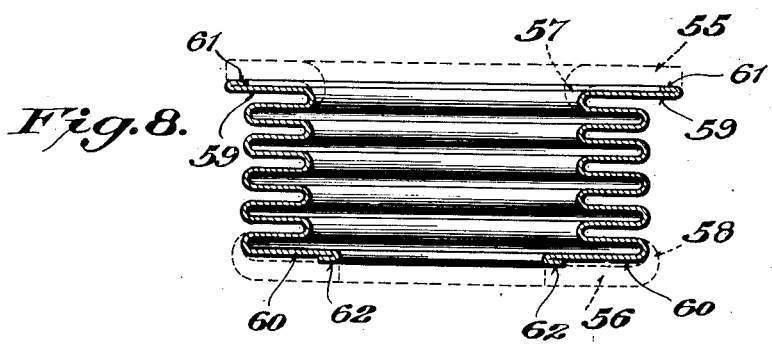

Fig. 7 illustrates an embodiment of the present invention wherein the reinforced flange is further strengthened by the use of a separate reinforcing member of the type disclosed in my patent above identified; and Fig. 8 illustrates an embodiment of the present invention wherein the outer section of the compressed corrugation is trimmed off so that only the periphery of the flange is strengthened, said figure showing in dotted lines the use of a separate reinforcing member in conjunction therewith.

In each of the figures, the thickness of the metal composing the wall has been considerably magnified in proportion to the other dimensions for the sake of clearness in illustrating the construction of said wall.

Figure 1:
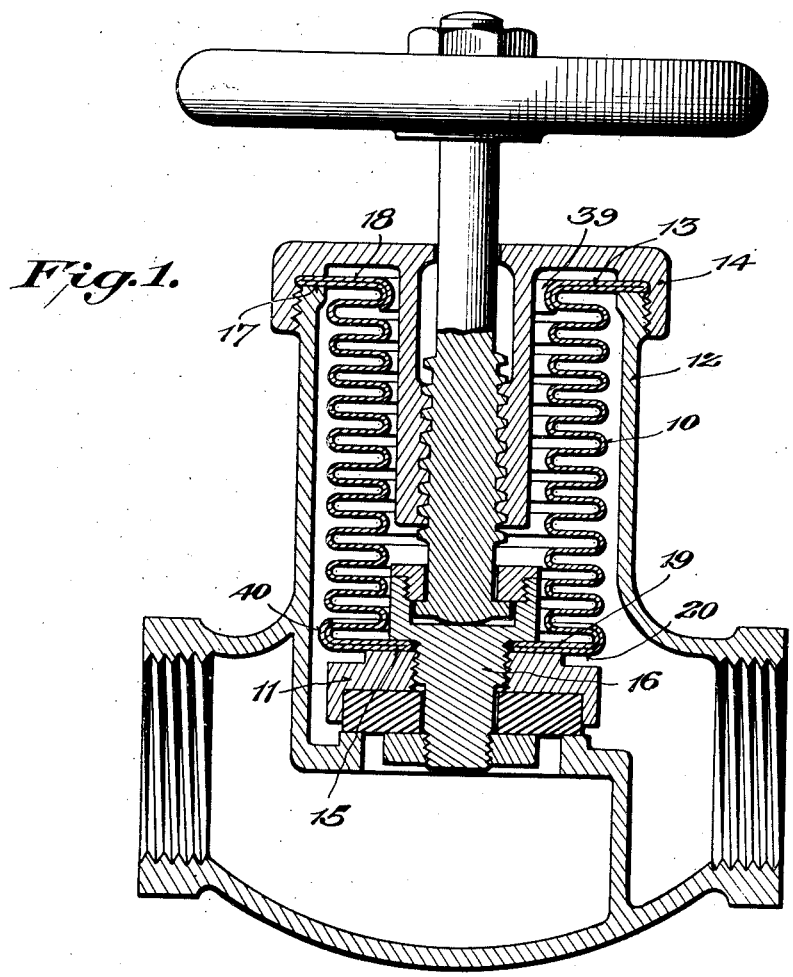
Fig. 1 is a vertical axial section of a packless valve employing a flexible corrugated tubular wall embodying the present invention.

In Fig. 1 a flexible corrugated tubular wall 10 is shown employed as a packing member between the valve member 11 and the valve casing 12. It is to be expressly understood, however, that this has been selected as illustrative of only one of a great variety of constructions in which walls of this character may be employed. In the form here shown, said wall 10, which may be constructed of any suitable metal, by any suitable process, and of any suitable size, form and dimensions, is provided at one end with a projecting flange 13 whereby said wall may be clamped between the body of the valve casing 12 and the bonnet or cap portion 14, and at the opposite end with a projecting flange 15 whereby said wall may be clamped between the body of the valve member 11 and an extension of the stem 16. Therefore, in this particular construction, the flexible corrugated tubular wall is provided with a flange at both of its ends, one projecting outwardly and the other projecting inwardly. It is to be expressly understood, however, that the invention is equally applicable to walls provided with a flange at only one of its ends, whether extending outwardly or inwardly, and also to walls wherein both of the flanges extend in the same direction, whether outwardly or inwardly.

In accordance with the present invention, each flange on the flexible corrugated tubular wall is reinforced by folding the end portion of the wall back upon itself so that the flange is composed of a plurality of sections which are integrally-continuous with the body of the wall and with each other. Thus in the form shown in Fig. 1, the flange 13 is formed of integrally-continuous substantially parallel sections 17 and 18, and the flange 15 is formed of integrally-continuous substantially parallel sections 19 and 20, the outer sections 18 and 20 respectively being folded back upon the sections 17 and 19 respectively so as to form a two-ply reinforced flange.

A reinforced flange of this character may be formed in any suitable way, but is preferably made by compressing one or more corrugations of said wall until their lateral walls are in reinforcing relation. When the flange is to project beyond the contiguous corrugations of the wall proper so as to afford an area for engagement with clamping elements, as in the embodiment shown in Fig. 1, the wall is provided at one or both of its ends, and at any suitable time during the manufacture of the wall, with one or more corrugations which are relatively deep as compared with the contiguous corrugations of the wall. Such relatively deep corrugations may be formed in any suitable way but, particularly when the corrugations in the body portion of the wall are formed by the process disclosed and claimed in my prior Patent No. 971,838, granted Oct. 4, 1910, and entitled Process of making tubular metal walls, may be desirably formed by a rolling process of the character outlined in said patent.

Referring to Fig. 2, I have shown a tubular blank 21 provided along its length with any suitable number of initial corrugations 22 spaced by uncorrugated portions 23, such as would be formed by the practice of the first corrugating step of the process disclosed in my patent above identified, said blank being also provided at each of its ends with broader and deeper corrugations 24 and 25, the latter, in the event that it is to form an inwardly-directed reinforced flange, being spaced from the next adjacent corrugation by a relatively wide uncorrugated portion 26. Said relatively broad and deep corrugations 25 and 26 may then be subjected to successive rolling operations in conformity with the process of my patent above identified so as to deepen and narrow the same until, together with the relatively wide uncorrugated portion 26, they are formed into relatively deep corrugations which project beyond the contiguous corrugations of the body portion of the wall, as shown in Fig. 3. In the latter figure, the corrugation 24 has been deepened and narrowed to form the relatively deep corrugation 27 projecting outwardly beyond the contiguous corrugation 28 of the body portion of the wall, and the corrugation 25 together with its adjacent uncorrugated portion 26 has been deepened and narrowed to form the relatively deep corrugation 29 projecting inwardly beyond the contiguous corrugation 30 of the body portion of the wall.

Therefore, the relatively deep corrugations may be formed by the same process and same machinery that is employed in forming the corrugations in the body portion of the wall, the only difference being that, in forming the relatively deep corrugations, the process employs broader and deeper rolls. Accordingly, said relatively deep corrugations may be formed on the same machine as is used in forming the body corrugations of the wall but, if desired, a separate machine with a separate set of rolls may be employed. It is to be expressly understood, however, that in place of forming said relatively deep corrugations by the method just outlined, any other suitable process may be employed if desired.

Figure 4:
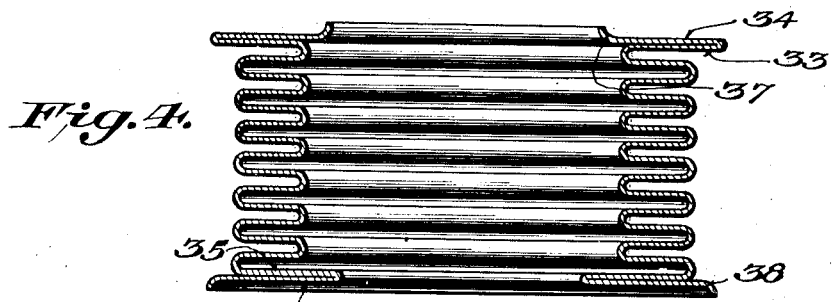
Fig. 4 is an axial section illustrating the lateral walls of such a deep corrugation pressed into engagement with each other.

Each relatively deep end corrugation is next compressed in any suitable way so that the lateral walls thereof are brought into reinforcing relationship, preferably until said lateral walls are brought into engagement with each other throughout their surfaces. According to the procedure diagrammatically illustrated in Fig. 3, opposed dies 31 and 32, of a size suitable to engage the projecting portion of the relatively deep corrugation 27, are forced toward each other until said corrugation is closed and its lateral walls 33 and 34 brought into engagement, as illustrated in Fig. 4. Similarly, the relatively deep corrugation 29 may be subjected to interior dies to close the same and bring its lateral walls 35 and 36 into engagement, as also illustrated in Fig. 4. In place of compressing the relatively deep corrugations by opposed dies, however, seaming rolls or any other suitable apparatus may be employed if desired.

After the relatively deep corugations have been compressed, the superfluous end portions of the blank are cut off. Such superfluous portions may be trimmed away flush with the periphery of the contiguous corrugations, but are preferably so cut as to leave projecting portions 37 and 38, which may thereafter be formed or shaped in any suitable way, as by spinning or the use of dies, so as to have reinforcing engagement with the bends of the contiguous corrugations for the purpose pointed out in my prior Patent No. 1,167,895. The width left in said projecting portions will vary with the width of the contiguous corrugations in the body portion of the wall, and should be such that said projecting portions may be spun or otherwise worked over so as to embrace and reinforce the bends of the contiguous corrugations as illustrated at 39 and 40 in Fig. 1.

Figure 5:
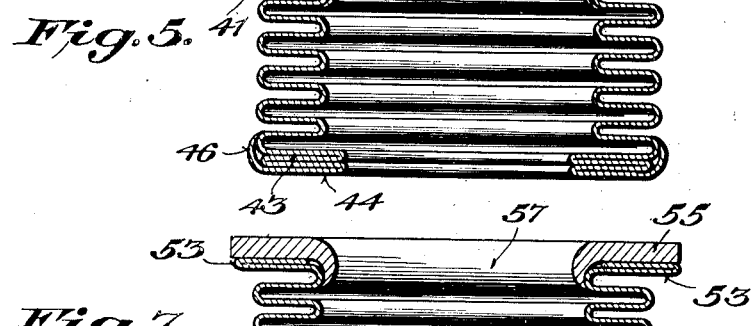
Fig. 5 illustrates an embodiment of the present invention wherein the reinforced flanges at each end of the wall are constructed from a plurality of relatively deep corrugations.

While a reinforced flange composed of two integrally contiguous sections formed by compressing a single relatively deep corrugation will frequently be sufficient, the reinforced flange may be made more rigid and strong when desired by forming the same of more than two-ply. This can be accomplished by forming and compressing in any suitable way, as by the method heretofore outlined, two or more relatively deep corrugations at one or both ends of the flexible corrugated tubular wall. In the form shown in Fig. 5, each of the flanges is made four-ply by compressing two relatively deep corrugations 41 and 42 at one end, and two relatively deep corrugations 43 and 44 at the opposite end, until their lateral walls are in engagement, the outer section of each of the reinforced flanges being also provided with a projecting portion which is spun or otherwise formed into reinforcing engagement with the bend of the contiguous corrugation, as illustrated at 45 and 46 respectively. While a four-ply flange has been illustrated, the flange may be made of three, five or more ply, if desired. Also, if desired, increased strength in each of the flanges may be secured by making one or more of the substantially parallel sections of the flange of greater thickness than the body portion of the wall, whether said flange be of two or more ply, but I prefer to form the reinforced flanges from corrugations having walls of substantially the same thickness as the main portion of the flexible corrugated tubular wall.

Figure 6:
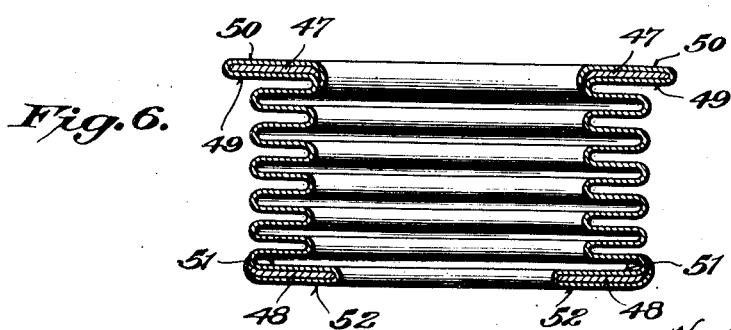
Fig. 6 illustrates an embodiment of the present invention wherein packing material is interposed between the lateral walls of the compressed corrugation.

A flange constructed in conformity with the present invention also facilitates the formation of fluid-tight joints, because packing material may be readily interposed between the substantially parallel sections of the reinforced flange and retained therein, owing to the integral construction of the flange, against the pressure to which the packing may be subjected. In the embodiment of the invention shown in Fig. 6, packing material 47 and 48, of any suitable character such as asbestos or composition, has been interposed between the substantially parallel walls 49, 50 and 51, 52 at the opposite ends of the wall respectively. It will be observed that in each instance the packing material is entirely enclosed by the folded metal of the reinforced flange and is therefore securely retained against being forced out by the pressure to which the wall is subjected. While the packing has been shown as interposed only in a two-ply reinforced flange, it is to be expressly understood that it may be employed equally well in conjunction with flanges having a greater number of ply.

While I prefer to provide each reinforced flange entirely of integrally-continuous sections compressed into reinforcing relationship as heretofore described, I may, if desired, employ a separate reinforcing member in conjunction with a reinforced flange of the character heretofore described. Thereby will be secured some of the advantages of the present invention, such as the avoidance of the tendency of the metal to crack under the spinning operation as well as the use of the special machinery and tools necessary to the forming of flanges by such an operation, while at the same time great strength and rigidity may be obtained by the use of the separate reinforcing members. Thus, in the form shown in Fig. 7, the reinforced flanges 53 and 54 have been further strengthened by suitably mounting thereon separate reinforcing members 55 and 56, respectively, of the character disclosed in my prior Patent No. 1,167,895. When separate reinforcing members of this character are employed, the outer sections of each of the reinforced flanges 53 and 54 may be trimmed off approximately flush with the periphery of the contiguous corrugation, and the separate reinforcing members provided with flanges 57 and 58 respectively to be spun or otherwise formed to embrace the bends of the contiguous corrugations and reinforce the latter, as pointed out in my prior patent last referred to. If desired, however, said end sections may be spun or otherwise formed into reinforcing relation to the bends of the contiguous corrugations, either with or without the use of the flanges 57 and 58. While separate reinforcing members have been shown as applied only to a two-ply reinforced flange, it is apparent that if desired separate reinforcing members may also be employed in conjunction with flanges of a larger number of ply. Likewise, separate reinforcing members may be used in conjunction with packing retained between the same and the reinforced flange, or between the sections of the reinforced flange, when desired.

Particularly if separate reinforcing members are to be employed, it is not necessary that the outer section of the reinforced flange extend throughout the width of said flange, as said section may be trimmed off so as to reinforce only the peripheral portion of said flange, and a separate reinforcing member be relied upon to supply additional strength and rigidity to the flange. In the form shown in Fig. 8, the reinforced flanges 59 and 60 are illustrated as having only relatively short integrally continuous sections 61 and 62 but pressed into folded engagement with the body portions of said flanges. Thereby some of the advantages of the present invention will still be obtained, because of the elimination of the loss of product, as well as the necessity for special machinery, incident to the use of the spinning process. It will be observed that this manner of constructing the reinforced flange affords strength and rigidity in said flange at the place where the metal is likely to be thinnest owing to the treatment to which it is subjected in forming the flange as well as where it is to be clamped between the co-operating elements of the parts with which the wall is to be associated. The overlapping sections of these reinforced flanges also facilitate the retention of packing if such is to be used. Separate reinforcing members 57 and 58 of the character illustrated in the embodiment of Fig. 7 may be mounted on said reinforced flanges as shown in dotted lines in Fig. 8.

While an outer section of the reinforced flange which extends in contact with the flange proper for only a portion of its width has been illustrated in conjunction with flanges formed only from a single relatively deep corrugation, it is apparent that the outermost section of flanges formed from a plurality of relatively deep corrugations may be made of the character illustrated in Fig. 8, if desired, and in any construction in which the outermost section is made of less width than the inner section or sections, said outermost section may be made to extend throughout such width of the inner section or sections as may be desired.

While the embodiments of the invention illustrated on the drawings employ only single-ply metal in the flexible corrugated tubular wall, it is to be expressly understood that the present invention may also be applied to a wall of laminated structure such as described in my prior Patent No. 979,460 granted Dec. 27, 1910, and entitled Flexible corrugated wall for collapsible and expansible vessels.

It will therefore be perceived that I have provided a reinforced flange for flexible corrugated tubular walls, as well as a method of making the same, whereby the special machinery and tools, as well as the additional labor and expense, incident to the formation of flanges by a spinning process and the manufacture of separate reinforcing members, is avoided, the loss incident to cracking of the metal during the spinning process is eliminated, and the necessity of manufacturing and handling separate parts, as well as the exercise of extreme care in assembling the same, is overcome. Furthermore, I have provided a reinforced flange and method of making the same whereby strong and durable flanges may be simply and inexpensively manufactured without the use of soldering, brazing or welding, while the formation of fluid-tight joints is facilitated.

While the embodiments of the invention illustrated on the drawings have been described with considerable particularity, it is to be expressly understood that the invention is not limited thereto, as the same is capable of receiving a variety of mechanical expressions and of being carried out in a variety of ways; changes may also be made in the details of construction and procedure and features of constructions illustrated in conjunction with some of the embodiments may be omitted or employed in conjunction with other embodiments, without departing from the spirit of this invention. Reference is therefore to be had to the claim hereto appended for a definition of the limits of said invention, it being understood that in said claim the reference to a wall having a flange at its end is to be construed as embracing such a flange at either or both of its ends.

What is claimed is:

A flexible corrugated tubular wall of thin metal provided at its end with a reinforced flange which projects radially beyond the flexible corrugations of said wall and is formed of one or more corrugations deeper than said flexible corrugations and constituted by sections which are integrally continuous with each other and with the flexibly corrugated portion of said wall, said sections being compressed into parallel reinforcing relationship forming a fluid-tight joint and having the periphery of the outermost section bent into reinforcing engagement with the bend of the contiguous corrugation.

In testimony whereof I have signed this specification.

WESTON M. FULTON.